(12) United States Patent
Hayashi

(10) Patent No.: US 6,757,089 B2
(45) Date of Patent: Jun. 29, 2004

(54) OPTICAL SCANNING DEVICE HAVING A DEFLECTION MIRROR TO SCAN A SCANNED SURFACE AT A CONSTANT VELOCITY VIA A LIGHT BEAM TO OBTAIN A LARGE EFFECTIVE WRITE WIDTH

(75) Inventor: Yoshinori Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 222 days.

(21) Appl. No.: 09/946,665

(22) Filed: Sep. 6, 2001

(65) Prior Publication Data

US 2002/0030879 A1 Mar. 14, 2002

(30) Foreign Application Priority Data

Sep. 8, 2000 (JP) ........................................ 2000-272541

(51) Int. Cl.[7] .............................................. G02B 26/08
(52) U.S. Cl. ........................................ 359/212; 359/205
(58) Field of Search ................................ 359/205, 206, 359/212; 347/257, 259, 260

(56) References Cited

U.S. PATENT DOCUMENTS

| | | | |
|---|---|---|---|
| 4,855,761 A | * | 8/1989 | Hiiro .......................... 347/259 |
| 5,557,448 A | | 9/1996 | Endo et al. |
| 5,570,224 A | | 10/1996 | Endo et al. |
| 5,581,392 A | | 12/1996 | Hayashi |
| 5,633,744 A | | 5/1997 | Nakajima |
| 5,652,670 A | | 7/1997 | Hayashi |
| 5,753,907 A | | 5/1998 | Nakajima et al. |
| 5,786,594 A | | 7/1998 | Ito et al. |
| 5,793,408 A | | 8/1998 | Nakajima |
| 5,875,051 A | | 2/1999 | Suzuki et al. |
| 5,936,756 A | | 8/1999 | Nakajima |
| 5,986,791 A | | 11/1999 | Suzuki et al. |
| 5,999,345 A | | 12/1999 | Nakajima et al. |
| 6,052,211 A | | 4/2000 | Nakajima |
| 6,069,724 A | | 5/2000 | Hayashi et al. |
| 6,081,386 A | | 6/2000 | Hayashi et al. |
| 6,091,534 A | | 7/2000 | Nakajima |
| 6,104,522 A | | 8/2000 | Hayashi et al. |
| 6,141,133 A | | 10/2000 | Suzuki et al. |
| 6,185,026 B1 | | 2/2001 | Hayashi et al. |
| 6,198,562 B1 | | 3/2001 | Hayashi et al. |
| 6,222,662 B1 | | 4/2001 | Suzuki et al. |
| 6,229,638 B1 | | 5/2001 | Sakai et al. |
| 6,384,949 B1 | | 5/2002 | Suzuki |
| 6,388,792 B1 | | 5/2002 | Atsuumi et al. |
| 6,400,917 B2 | * | 6/2002 | Nakazato et al. ........... 347/257 |
| 6,417,509 B1 | | 7/2002 | Atsuumi et al. |
| 6,429,956 B2 | | 8/2002 | Itabashi |
| 6,445,482 B1 | | 9/2002 | Hayashi |
| 6,448,998 B1 | | 9/2002 | Suzuki et al. |
| 6,498,617 B1 | | 12/2002 | Ishida et al. |

FOREIGN PATENT DOCUMENTS

JP 8-75475 3/1996

* cited by examiner

*Primary Examiner*—Euncha Cherry
(74) *Attorney, Agent, or Firm*—Oblon, Spivak, McClelland, Maier & Neustadt, P.C.

(57) ABSTRACT

An optical scanning device is provided. The optical scanning device comprises a light source, a deflection mirror reflectively deflecting a light beam projected from the light source by performing a sine-wave oscillation, a scanning optical element causing the light beam reflectively deflected by the deflection mirror to scan a scanned surface at a substantially constant velocity, wherein the following conditional expression is fulfilled: $0.4 < \phi max/\phi 0 < 0.9/[(20/\phi 0)^{(1/4)}]$. In this conditional expression, $\phi 0$ is an amplitude angle of the sine-wave oscillation of the deflection mirror, and $\phi max$ is a maximum rotational angle of the deflection mirror corresponding to an effective write width.

8 Claims, 6 Drawing Sheets

- ◆ IDEAL HEIGHT OF IMAGE
- ▲ HEIGHT OF IMAGE OF AN IDEAL f·tan θ LENS

FIG.12

OPTICAL SCANNING DEVICE HAVING A DEFLECTION MIRROR TO SCAN A SCANNED SURFACE AT A CONSTANT VELOCITY VIA A LIGHT BEAM TO OBTAIN A LARGE EFFECTIVE WRITE WIDTH

BACKGROUND OF THE INVENTION

1. Field of the Invention

The present invention generally relates to an optical scanning device and an image-forming device, and more particularly, to an optical scanning device and an image-forming device using this optical scanning device, such as a laser beam printer, a facsimile using plain paper, or a digital copying machine.

2. Description of the Related Art

Conventionally, there has been a well-known optical scanning device in which a light beam is reflectively deflected so that the light beam scans a scanned surface. Specifically, this optical scanning device reflectively deflects a laser light by using an optical deflector so that the laser light scans the scanned surface, and at the same time, turns on and off the laser light by using an image signal so as to write an image on the scanned surface.

A revolving polygon mirror revolving at a constant velocity is widely used as the above-mentioned optical deflector. However, the revolving polygon mirror requires a large-scale device. Additionally, the revolving polygon mirror involves a mechanical high-speed revolution, and thus causes such problems as a bounding due to vibrations, a temperature rise, noises, and an increase in the amount of consumed electric power.

On the other hand, there has been proposed a micro mirror having a resonant structure, using a micro-machine technology, which oscillates in a sine-wave form. Using this micro mirror in an optical scanning device can make the optical scanning device small, and can reduce the above-mentioned bounding due to vibrations, the temperature rise, the noises, and the amount of consumed electric power. Japanese Laid-Open Patent Application No. 8-75475 describes an optical scanning device employing a deflection mirror utilizing a resonance as mentioned above.

An optical scanning device is generally required to control a light beam reflectively deflected by an optical deflector in such a manner that the light beam scans a scanned surface at a substantially constant velocity, and also is required to have a predetermined effective write width.

Such an optical scanning device employing a deflection mirror utilizing a resonance as mentioned above is also required to control a light beam reflectively deflected by the deflection mirror oscillating in a sine-wave form so that the light beam scans a scanned surface at a substantially constant velocity, and at the same time, is required to obtain a large effective write width.

SUMMARY OF THE INVENTION

It is a general object of the present invention to provide an improved and useful optical scanning device and an image-forming device in which the above-mentioned problems are eliminated.

A more specific object of the present invention is to provide an optical scanning device and an image-forming device which can obtain a large effective write width, and can provide an excellent constant-velocity scanning property on a scanned surface.

In order to achieve the above-mentioned objects, there is provided according to one aspect of the present invention an optical scanning device comprising:

a light source;

a deflection mirror reflectively deflecting a light beam projected from the light source by performing a sine-wave oscillation; and a scanning optical element causing the light beam reflectively deflected by the deflection mirror to scan a scanned surface at a substantially constant velocity, wherein the following conditional expression is fulfilled:

$$0.4 < \phi max/\phi 0 < 0.9/[(20/\phi 0)^{(1/4)}],$$

where:

$\phi 0$ is an amplitude angle of the sine-wave oscillation of the deflection mirror, the amplitude angle being represented by degrees; and $\phi max$ is a maximum rotational angle of the deflection mirror corresponding to an effective write width, the maximum rotational angle being represented by degrees.

According to the present invention, using the deflection mirror reflectively deflecting a light beam by oscillating in a sine-wave form can alleviate a bounding due to vibrations, a temperature rise, noises, and the amount of consumed electric power. Also, fulfilling the foregoing conditional expression can provide a large effective write width, and can realize an excellent constant-velocity scanning property on a scanned surface.

Additionally, in the optical scanning device according to the present invention, the following conditional expression may be fulfilled:

$$0.5 < \phi max/\phi 0 < 0.8/[(20/\phi 0)^{(1/4)}].$$

According to the present invention, fulfilling this conditional expression can provide a larger effective write width, and can realize a more excellent constant-velocity scanning property on a scanned surface.

In order to achieve the above-mentioned objects, there is also provided according to another aspect of the present invention an optical scanning device comprising:

a light source;

a deflection mirror reflectively deflecting a light beam projected from the light source by performing a sine-wave oscillation;

a reflective surface placed opposite the deflection mirror so as to reflect the light beam reflectively deflected by the deflection mirror to the deflection mirror; and a scanning optical element causing the light beam to scan a scanned surface at a substantially constant velocity, the light beam being reflectively deflected by the deflection mirror at least twice, wherein the following conditional expression is fulfilled:

$$0.4 < \phi max/\phi 0 < 0.9/[(20/(\phi 0 \times M))^{(1/4)}],$$

where:

$\phi 0$ is an amplitude angle of the sine-wave oscillation of the deflection mirror, the amplitude angle being represented by degrees;

$\phi max$ is a maximum rotational angle of the deflection mirror corresponding to an effective write width, the maximum rotational angle being represented by degrees; and M is a number of times the light beam is reflectively deflected by the deflection mirror.

According to the present invention, using the deflection mirror reflectively deflecting a light beam by oscillating in a sine-wave form can alleviate a bounding due to vibrations, a temperature rise, noises, and the amount of consumed electric power. Additionally, the light beam is reflected between the reflective surface and the deflection mirror several times, i.e., the light beam is reflected by the deflection mirror a plurality of times, so as to obtain a large effective write width. Further, fulfilling the foregoing conditional expression can provide a still larger effective write width, and can realize an excellent constant-velocity scanning property on a scanned surface.

Additionally, in the optical scanning device according to the present invention, the following conditional expression may be fulfilled:

$$0.5 < \phi max/\phi 0 < 0.8/[(20/(\phi 0 \times M))^{\hat{}}(1/4)].$$

According to the present invention, fulfilling this conditional expression can provide a still larger effective write width, and can realize a more excellent constant-velocity scanning property on a scanned surface.

In order to achieve the above-mentioned objects, there is also provided according to another aspect of the present invention an image-forming device comprising at least one of the above-mentioned optical scanning devices causing a light beam to scan a scanned surface of an image-bearing member so as to form an electrostatic latent image on the scanned surface of the image-bearing member.

According to the present invention, by using the optical scanning devices employing the above-mentioned deflection mirror, an image with an excellent quality can be formed.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of an optical scanning device and an image-forming device as embodiments according to the present invention.

Figure 1:
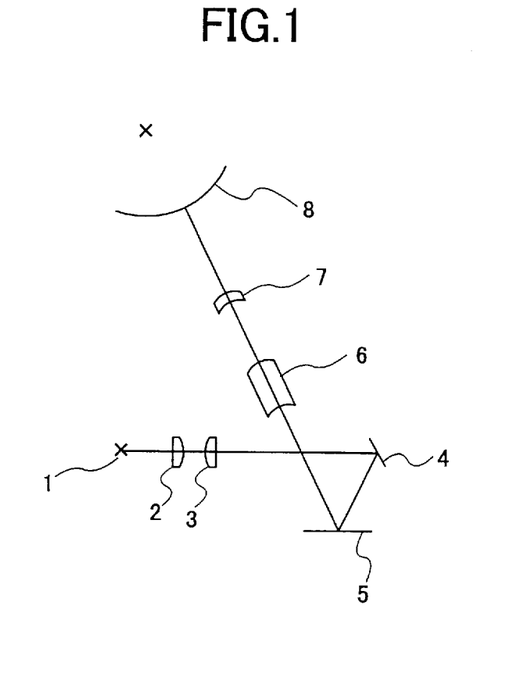
FIG. 1 is a cross-sectional view, taken along a sub-scanning direction, of optical arrangements in an optical scanning device according to a first embodiment of the present invention.
Figure 2:
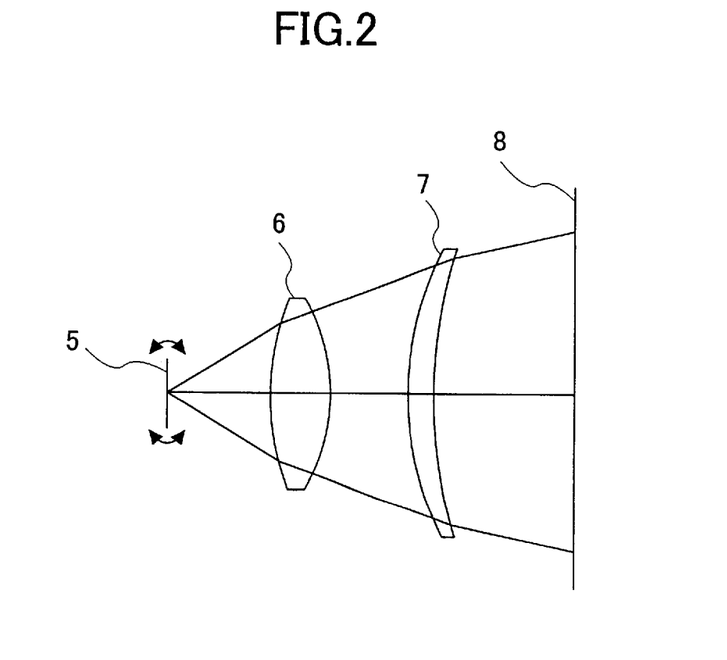
FIG. 2 is a cross-sectional view, taken along a main scanning direction, of the optical arrangements in the optical scanning device according to the first embodiment of the present invention.

FIG. 1 is a cross-sectional view taken along a sub-scanning direction of an optical scanning device according to an embodiment of the present invention. FIG. 2 is a cross-sectional view taken along a main scanning direction thereof, i.e., a cross-sectional view in a deflection plane.

In FIG. 1 and FIG. 2, a coupling lens 2, a cylindrical lens 3, and a mirror 4 are placed in this order on a course of a laser light beam projected from a light source 1 composed of a semiconductor laser. A deflection mirror 5 composed of a sine-wave oscillation mirror is placed on a course of a reflection light from the mirror 4. A first scanning lens 6 as a scanning optical element, a second scanning lens 7 as a scanning optical element, and a photosensitive member 8 are placed in this order on a course of a reflectively deflected light beam from the deflection mirror 5.

The laser light beam projected from the light source 1 is coupled in the coupling lens 2, and then is focused only in the sub-scanning direction by the cylindrical lens 3. Then, the image of the focused light beam, via the mirror 4, is formed as a linear image extending in the main scanning direction in the vicinity of a deflective reflection surface of the deflection mirror 5.

The image of the light beam reflected from the deflection mirror 5 is formed in the vicinity of a scanned surface of the photosensitive member 8 by the first scanning lens 6 and the second scanning lens 7. The incident light beam on the deflection mirror 5 is reflectively deflected by the deflection mirror 5 oscillating in a sine-wave form, and scans the scanned surface.

The first scanning lens 6 and the second scanning lens 7 are long lens so as to cover a deflection range of the light beam reflectively deflected by the deflection mirror 5, and also have a function of converting the light beam reflectively deflected by the deflection mirror 5 so that the light beam scans the scanned surface at a substantially constant velocity.

In FIG. 1, each of the optical components is so arranged that the light source 1 projects the laser light beam transversely, the mirror 4 reflects this light beam toward the bottom left in the figure, and the deflection mirror 5 reflects the light beam toward the top left in the figure, with a contrivance to arrange the optical components compactly in a limited space. Besides, the deflection mirror 5 may replace the mirror 4 so as to omit the mirror 4.

Conventionally, a lens, which functions so that a light beam deflected at a substantially constant angular velocity by a revolving polygon mirror etc. has a substantially constant velocity on a scanned surface, is referred to as an fθ lens. A height of image Y becomes fθ while an angle of view is θ. "f" is a focal distance of a scanning lens.

On the other hand, when a normal photographic lens is used, a height of image Y becomes f·tanθ. In this specification, such a lens as this is referred to as an f·tanθ lens. The f·tanθ lens and the fθ lens have different characteristics. When an angle of view is 50° or less as is a normal case in an optical scanning device, degrees of correction do not vary very much with respect to the f·tanθ lens and the fθ lens, and both the f·tanθ lens and the fθ lens are easy to design. However, the f·tanθ lens is more advantageous when designed into a shape, such as a sphere with a small degree of freedom in designing. Therefore, the present description will be given in comparison with the ideal f·tanθ lens.

Figure 3:
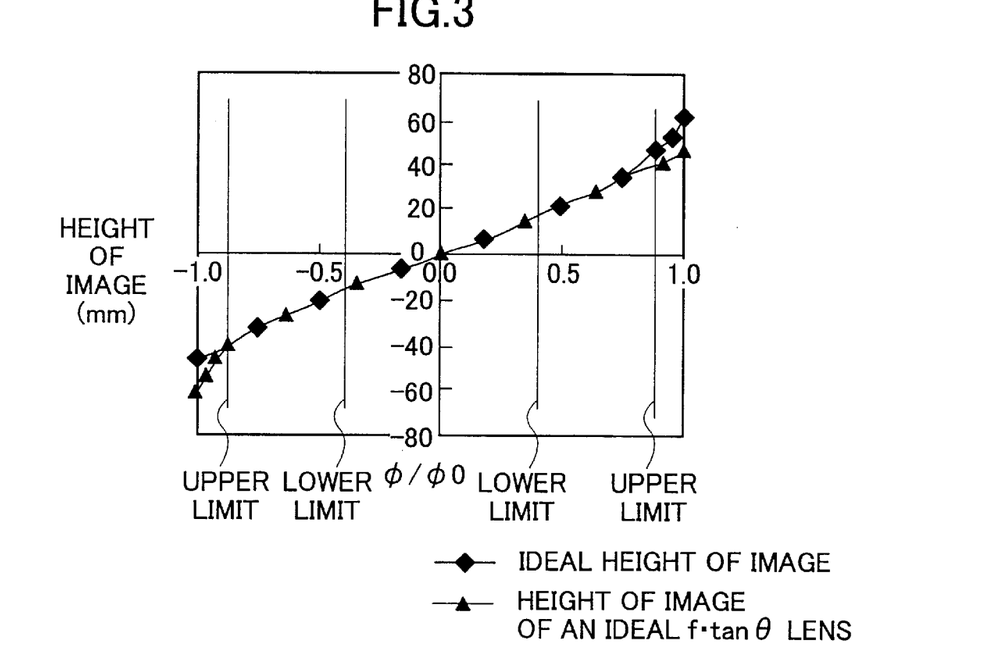
FIG. 3 is a diagram showing a height of image of an ideal f·tanθ lens, and an ideal height of image for use in scanning a scanned surface at a constant velocity, in a case of an amplitude angle of a sine-wave oscillation of a deflection mirror shown in FIG. 1 being 20°.

FIG. 3 shows a height of image when the ideal f·tanθ lens is used, and also shows an ideal height of image for use in scanning the scanned surface at a constant velocity, with the axis of abscissas of $\phi/\phi 0$, in which an amplitude angle of a sine-wave oscillation of the deflection mirror 5 (=$\phi 0$) is 20°, and an amplitude corresponding to an angle of view is $\phi$. In order that the first scanning lens 6 and the second scanning lens 7 provide an excellent constant-velocity scanning property on the scanned surface when used together with the deflection mirror 5 oscillating in a sine-wave form, the difference between the height of image of the ideal f·tanθ lens and the ideal height of image should be as small as possible.

It is noted regarding FIG. 3 that absolute values of the heights of image indicated on the axis of ordinates are provisional values, and thus can be multiplied in proportion.

As shown in FIG. 3, beyond upper limits, the differences between the ideal height of image and the height of image of the ideal f·tanθ lens become sharply large. On the other hand, below lower limits, an effective scan width cannot be secured. It is noted here that the upper limits and the lower limits are upper and lower limits shown in a conditional expression (1) described hereinafter.

Figure 4:
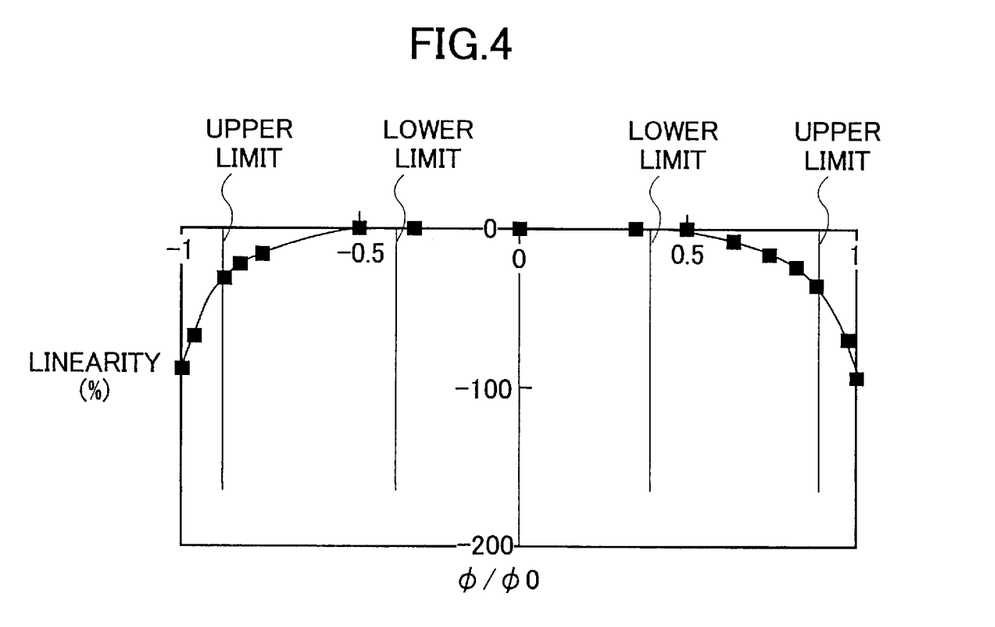
FIG. 4 is a diagram showing a linearity of the ideal f·tanθ lens in the case of the amplitude angle of the sine-wave oscillation of the deflection mirror shown in FIG. 1 being 20°.

FIG. 4 shows a linearity of the ideal f·tanθ lens in the same condition as in FIG. 3. As shown in FIG. 4, beyond the upper limits, the linearity of the ideal f·tanθ lens becomes sharply deteriorated.

Figure 5:
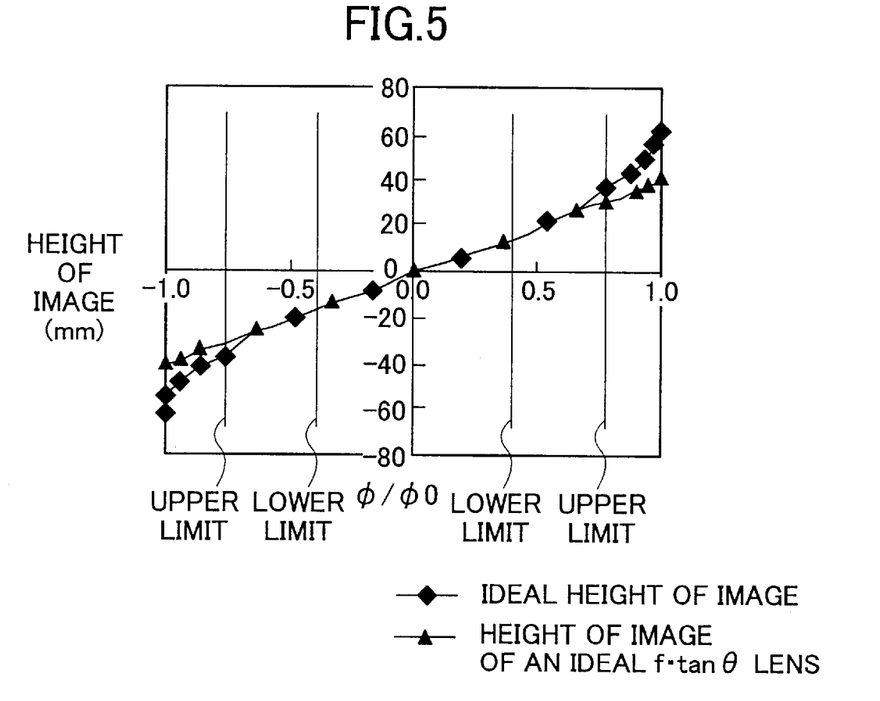
FIG. 5 is a diagram showing a height of image of an ideal f·tanθ lens, and an ideal height of image for use in scanning a scanned surface at a constant velocity, in a case of an amplitude angle of a sine-wave oscillation of the deflection mirror shown in FIG. 1 being 10°.

FIG. 5 shows a height of image when the ideal f·tanθ lens is used, and an ideal height of image for use in scanning the scanned surface at a constant velocity, with the axis of abscissas of $\phi/\phi 0$, in which an amplitude angle of a sine-wave oscillation of the deflection mirror 5 (=$\phi 0$) is 10°, and an amplitude corresponding to an angle of view is $\phi$. As shown in FIG. 5, beyond upper limits, the differences between the ideal height of image and the height of image of the ideal f·tanθ lens also become sharply large.

Also on the other hand, below lower limits, an effective scan width cannot be secured.

Figure 6:
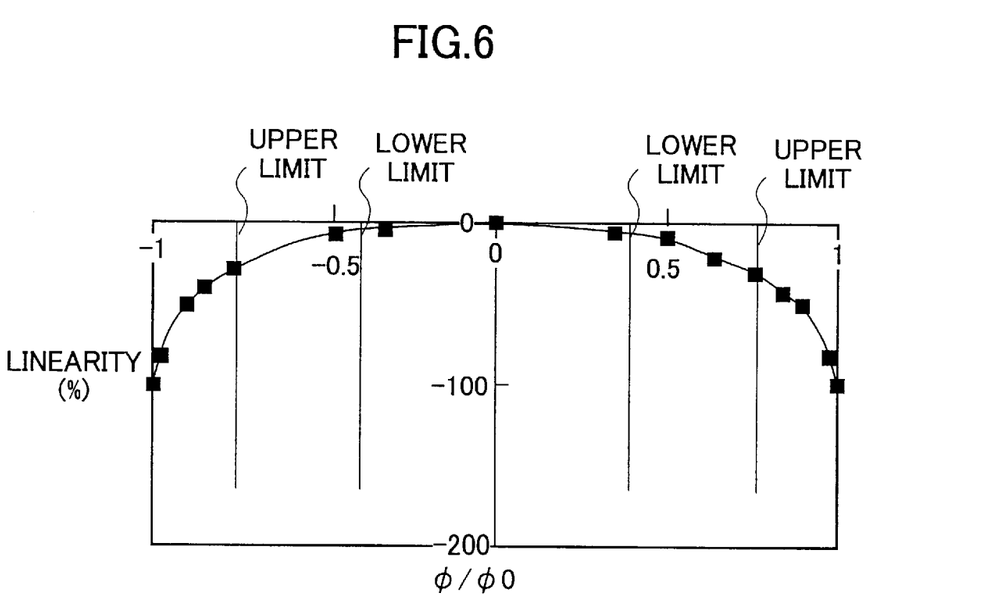
FIG. 6 is a diagram showing a linearity of the ideal f·tanθ lens in the case of the amplitude angle of the sine-wave oscillation of the deflection mirror shown in FIG. 1 being 10°.

FIG. 6 shows a linearity of the ideal f·tanθ lens in the same condition as in FIG. 5. As shown in FIG. 6 also, beyond the upper limits, the linearity of the ideal f·tanθ lens becomes sharply deteriorated.

From the above description, in designing a scanning optical system using a deflection mirror providing a deflective reflection by oscillating in a sine-wave form, the following conditional expression (1) needs to be fulfilled so as to secure a large effective write width and provide an excellent constant-velocity scanning property on the scanned surface.

$$0.4 < \phi max/\phi 0 < 0.9/[(20/\phi 0)^{(1/4)}] \qquad \text{Conditional expression (1)}$$

$\phi 0$: Amplitude angle (°) of a sine-wave oscillation of a deflection mirror $\phi max$: Maximum rotational angle (°) of the deflection mirror corresponding to an effective write width It is more preferable that the following conditional expression be fulfilled.

$$0.5 < \phi max/\phi 0 < 0.8/[(20/\phi 0)^{(1/4)}]$$

Next, a description will be given of another embodiment according to the present invention. The embodiment shown in FIG. 7 and FIG. 8 includes an opposite mirror 9 in addition to the embodiment shown in FIG. 1 and FIG. 2. The opposite mirror 9 is so placed that a reflective surface thereof opposes a reflective surface of the deflection mirror 5.

Figure 7:
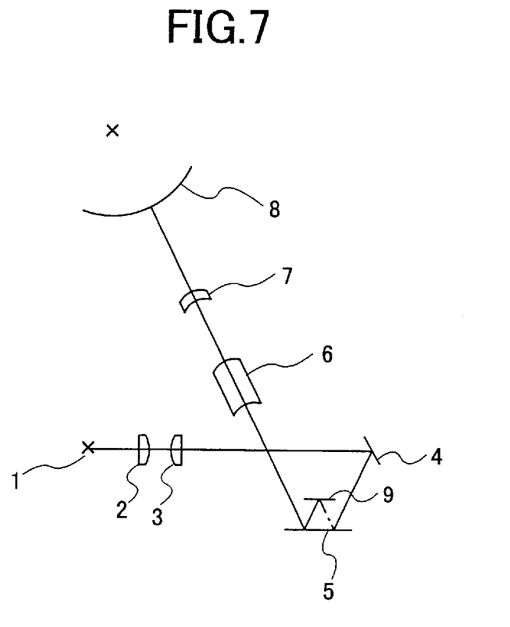
FIG. 7 is a cross-sectional view, taken along a sub-scanning direction, of optical arrangements in an optical scanning device according to a second embodiment of the present invention.
Figure 8:
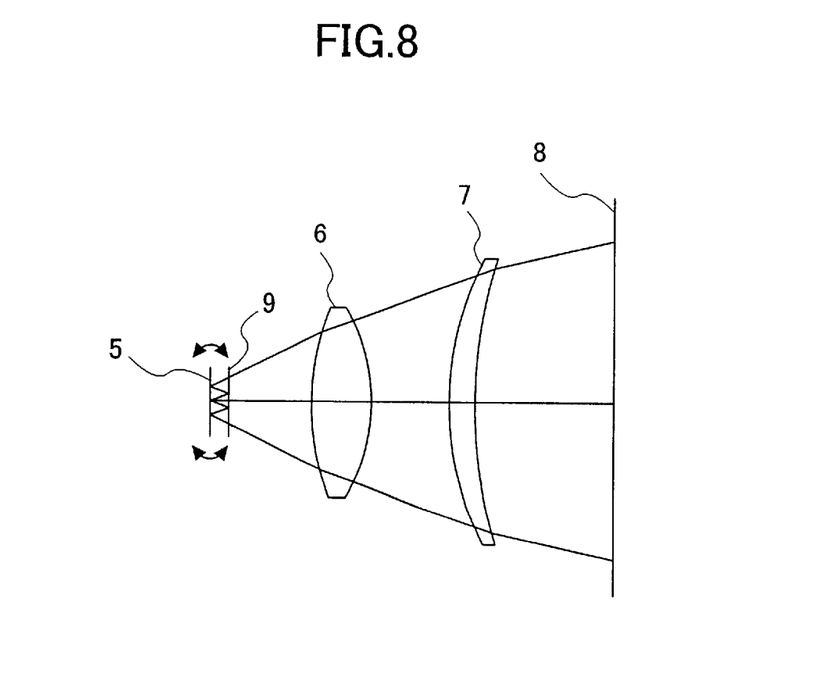
FIG. 8 is a cross-sectional view, taken along a main scanning direction, of the optical arrangements in the optical scanning device according to the second embodiment of the present invention.

In FIG. 7 and FIG. 8, a laser light beam projected from the light source 1 is coupled in the coupling lens 2, and then the image of the light beam is formed by the cylindrical lens 3 as a linear image extending in the main scanning direction at a proper position, for example in the vicinity of the deflective reflection surface of the deflection mirror 5. The light beam is reflected on the mirror 4, and enters the deflection mirror 5. Then, the light beam reflected on the deflection mirror 5 subsequently is reflected on the opposite mirror 9, and again heads for the deflection mirror 5. The light beam is reflected again on the deflection mirror 5, and heads for the first scanning lens 6 and the second scanning lens 7. The image of the light beam reflected from the deflection mirror 5 is formed in the vicinity of the scanned surface of the photosensitive member 8 by the first scanning lens 6 and the second scanning lens 7, and the light beam scans the scanned surface at a substantially constant velocity.

Figure 9:
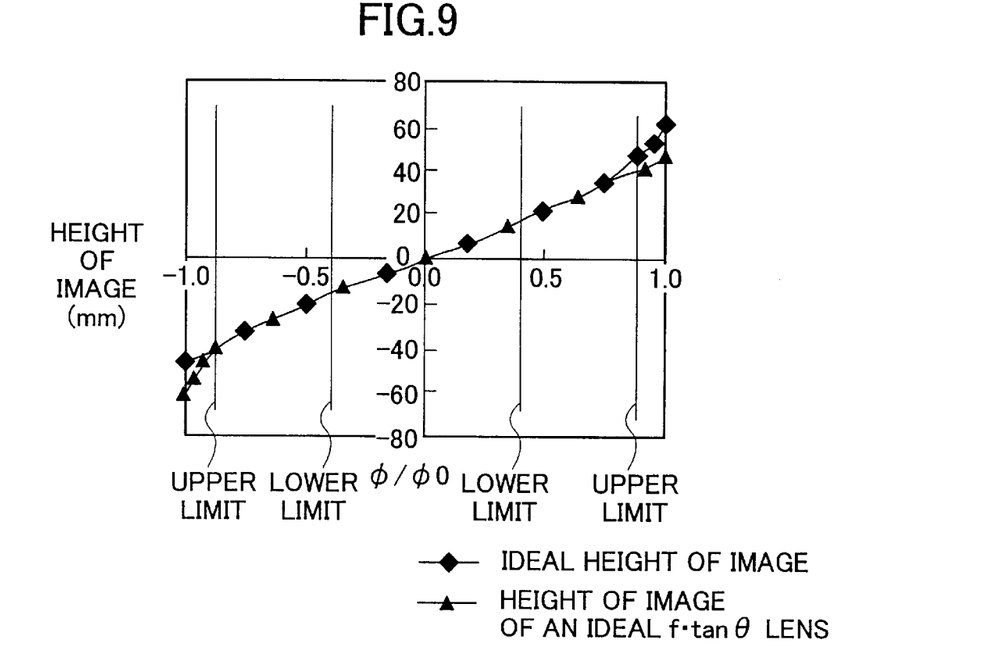
FIG. 9 is a diagram showing a height of image of an ideal f·tanθ lens, and an ideal height of image for use in scanning a scanned surface at a constant velocity, in a case of an amplitude angle of a sine-wave oscillation of a deflection mirror shown in FIG. 7 being 20°.

The following description will be given of a case where an amplitude angle of a sine-wave oscillation of the deflection mirror 5 (=$\phi 0$) is 10°, and the light beam is reflected on the deflection mirror 5 twice. FIG. 9 shows a height of image when the ideal f·tanθ lens is used, and an ideal height of image for use in scanning the scanned surface at a constant velocity, with the axis of abscissas of $\phi/\phi 0$, in which an amplitude corresponding to an angle of view is $\phi$. Ranges between upper limits and lower limits shown in FIG. 9 respectively are a range defined in a conditional expression (2) below.

$$0.4 < \phi max/\phi 0 < 0.9/[(20/(\phi 0 \times M))^{(1/4)}] \qquad \text{Conditional expression (2)}$$

$\phi 0$: Amplitude angle (°) of a sine-wave oscillation of a deflection mirror $\phi max$: Maximum rotational angle (°) of the deflection mirror corresponding to an effective write width M: Number of times a light beam is reflected on the deflection mirror As shown in FIG. 9, beyond the upper limits, the differences between the ideal height of image and the height of image of the ideal f·tanθ lens become sharply large. On the other hand, below the lower limits, an effective scan width cannot be secured.

Figure 10:
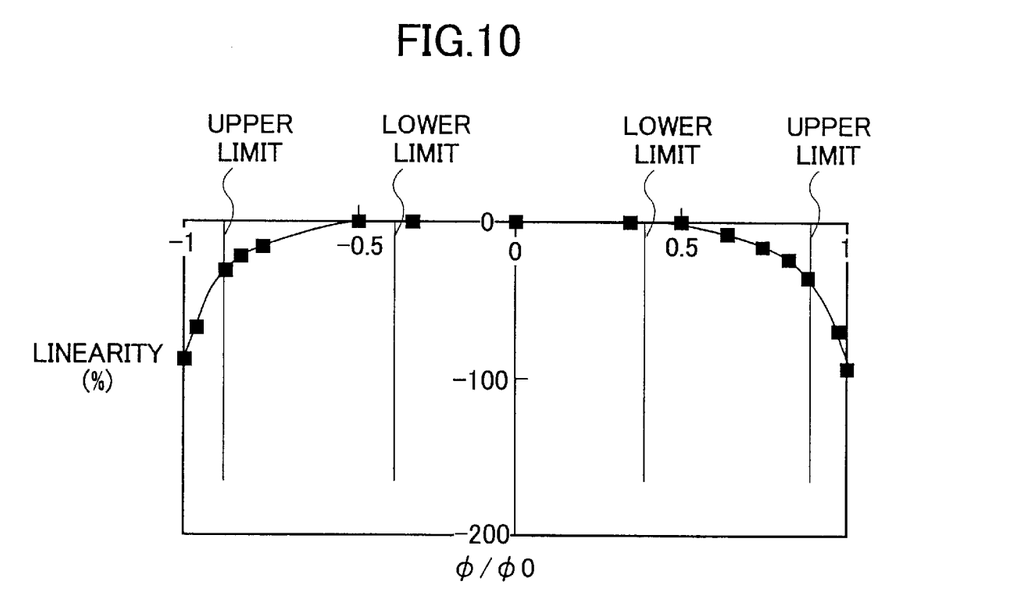
FIG. 10 is a diagram showing a linearity of the ideal f·tanθ lens in the case of the amplitude angle of the sine-wave oscillation of the deflection mirror shown in FIG. 7 being 20°.

FIG. 10 shows a linearity of the ideal f·tanθ lens in the same condition as in FIG. 9. As shown in FIG. 10, beyond the upper limits, the linearity of the ideal f·tanθ lens becomes sharply deteriorated.

Figure 11:
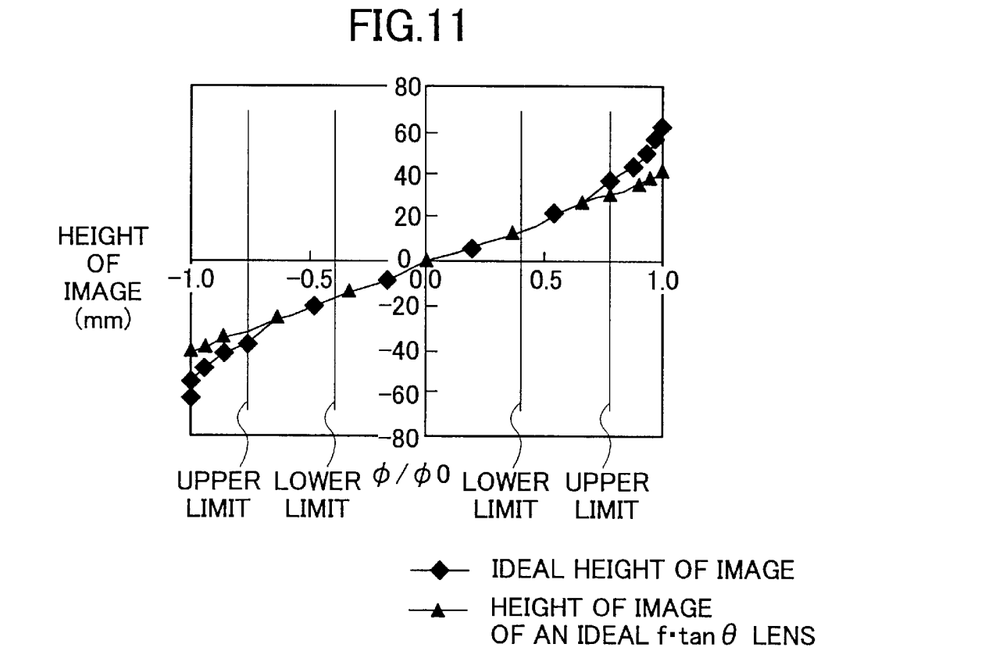
FIG. 11 is a diagram showing a height of image of an ideal f·tanθ lens, and an ideal height of image for use in scanning a scanned surface at a constant velocity, in a case of an amplitude angle of a sine-wave oscillation of the deflection mirror shown in FIG. 7 being 10°.

FIG. 11 shows a height of image when the ideal f·tanθ lens is used, and an ideal height of image for use in scanning the scanned surface at a constant velocity, with the axis of abscissas of $\phi/\phi 0$, in which an amplitude angle of a sine-wave oscillation of the deflection mirror 5 $(=\phi 0)$ is 5°, and the light beam is reflected on the deflection mirror 5 twice, an amplitude corresponding to an angle of view being $\phi$. As shown in FIG. 11, beyond upper limits, the differences between the ideal height of image and the height of image of the ideal f·tanθ lens also become sharply large. Also on the other hand, below lower limits, an effective scan width cannot be secured.

Figure 12:
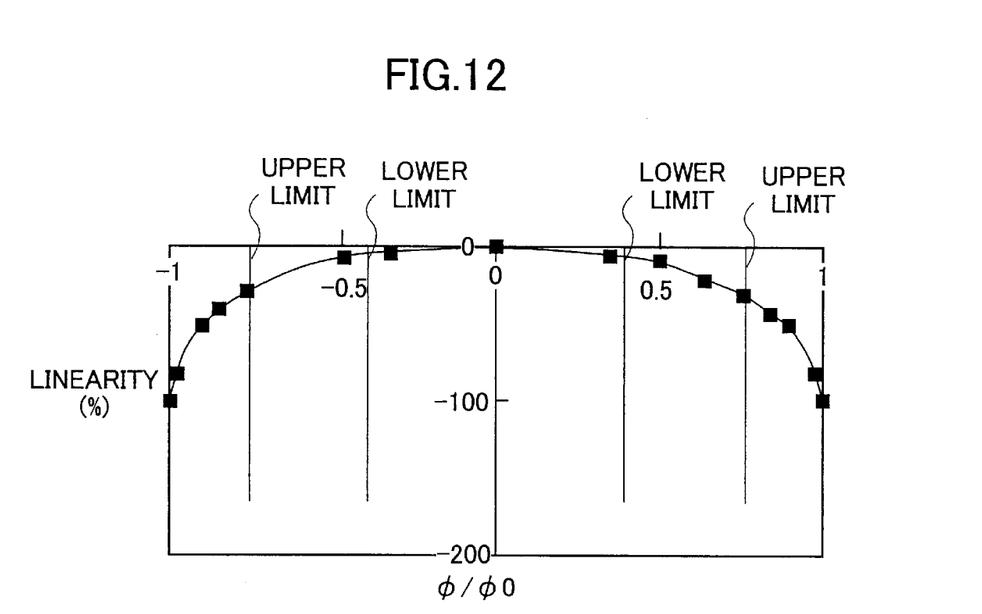
FIG. 12 is a diagram showing a linearity of the ideal f·tanθ lens in the case of the amplitude angle of the sine-wave oscillation of the deflection mirror shown in FIG. 7 being 10°.

FIG. 12 shows a linearity of the ideal f·tanθ lens in the same condition as in FIG. 11. As shown in FIG. 12 also, beyond the upper limits, the linearity of the ideal f·tanθ lens becomes sharply deteriorated.

From the above description, in designing a scanning optical system using a deflection mirror providing a multiple deflective reflection by oscillating in a sine-wave form, the foregoing conditional expression (2) needs to be fulfilled so as to secure a large effective write width and provide an excellent constant-velocity scanning property on the scanned surface.

It is more preferable that the following conditional expression be fulfilled.

$$0.5<\phi max/\phi 0<0.8/[(20/(\phi 0\times M))^{\hat{}}(1/4)]$$

Additionally, in order to secure a larger effective write width, scanning optical systems according to the present invention may be aligned in the main scanning direction. For example, when an effective write width of one scanning optical system is 200 mm, two scanning optical systems can be aligned in the main scanning direction so as to obtain an effective write width of 400 mm.

Besides, the light beam may be reflected on the deflection mirror 5 three times or more.

The optical scanning device according to the present invention can be used in an image-forming device, such as a digital copying machine, a fax machine, or a laser printer. Specifically, the scanned surface of the photosensitive member 8 is used as a surface of an image-bearing member, and the uniformly electrified surface of the image-bearing member is scanned by a laser light beam which turns on and off according to an image signal so as to form an electrostatic latent image on the surface of the image-bearing member. The electrostatic latent image is developed with a toner, and the toner image is transferred to a transfer sheet, and is fixed thereon by heating, whereas the image-bearing member is cleaned. By performing the above-described series of processes of electrophotography, a predetermined image can be formed on the transfer sheet.

The present invention is not limited to the specifically disclosed embodiments, and variations and modifications may be made without departing from the scope of the present invention.

The present application is based on Japanese priority application No. 2000-272541 filed on Sep. 8, 2000, the entire contents of which are hereby incorporated by reference.

What is claimed is:

1. An optical scanning device comprising:
a light source;
a coupling optical system coupling a light beam projected from said light source;
a deflection mirror;
a linear image optical system forming said light beam from said coupling optical system into a linear image in a vicinity of the deflection mirror;
the deflection mirror reflectively deflecting said light beam from said linear image optical system by performing a sine-wave oscillation; and
a scanning optical system composed of a scanning lens causing said light beam reflectively deflected by said deflection mirror to scan a scanned surface at a substantially constant velocity,
wherein the following conditional expression is fulfilled:

$$0.4<\Phi max/\Phi 0<0.9/[(20/\Phi 0)^{\hat{}}(1/4)],$$

where:
$\Phi 0$ is an amplitude angle of said sine-wave oscillation of said deflection mirror, the amplitude angle being represented by degrees; and
$\Phi max$ is a maximum rotational angle of said deflection mirror corresponding to an effective write width, the maximum rotational angle being represented by degrees.

2. The optical scanning device as claimed in claim 1, wherein the following conditional expression is fulfilled:

$$0.5<\phi max/\phi 0<0.8/[(20/\phi 0)^{\hat{}}(1/4)].$$

3. An optical scanning device comprising:
a light source;
a coupling optical system coupling a light beam projected from said light source;
a deflection mirror;
a linear image optical system forming said light beam from said coupling optical system into a linear image in a vicinity of the deflection mirror;
the deflection mirror reflectively deflecting said light beam from said linear image optical system by performing a sine-wave oscillation;
a reflective surface placed opposite said deflection mirror so as to reflect said light beam reflectively deflected by said deflection mirror to said deflection mirror; and
a scanning optical system composed of a scanning lens causing said light beam to scan a scanned surface at a substantially constant velocity, the light beam being reflectively deflected by said deflection mirror at least twice,
wherein the following conditional expression is fulfilled:

$$0.4<\Phi max/\Phi 0<0.9/[(20/(\Phi 0\times M))^{\hat{}}(1/4)],$$

where:
$\Phi 0$ is an amplitude angle of said sine-rave oscillation of said deflection mirror, the amplitude angle being represented by degrees;
$\Phi max$ is a maximum rotational angle of said deflection mirror corresponding to an effective write width, the maximum rotational angle being represented by degrees; and
M is a number of times said light beam is reflectively deflected by said deflection mirror.

4. The optical scanning device as claimed in claim 3, wherein the following conditional expression is fulfilled:

$$0.5 < \phi max/\phi 0 < 0.8/[(20/(\phi 0 \times M))^{(1/4)}].$$

5. An image-forming device comprising:
at least one optical scanning device including:
- a light source;
- a coupling optical system coupling a light beam protected from said light source;
- a deflection mirror;
- a linear image optical system forming said light beam from said coupling optical system into a linear image in a vicinity of the deflection mirror;
- the deflection mirror reflectively deflecting said light beam from said linear image optical system by performing a sine-wave oscillation; and
- a scanning optical system composed of a scanning lens causing said light beam reflectively deflected by said deflection mirror to scan a scanned surface of an image-bearing member at a substantially constant velocity so as to form an electrostatic latent image on said scanned surface of said image-bearing member, wherein the following conditional expression is fulfilled:

$$0.4 < \Phi max/\Phi 0 < 0.9/[(20/\Phi 0)^{(1/4)}),$$

where:
- $\Phi 0$ is an amplitude angle of said sine-wave oscillation of said deflection mirror, the amplitude angle being represented by degrees; and
- $\Phi max$ is a maximum rotational angle of said deflection mirror corresponding to an effective write width, the maximum rotational angle being represented by degrees.

6. The image-forming device as claimed in claim 5, wherein the following conditional expression is fulfilled:

$$0.5 < \phi max/\phi 0 < 0.8/[(20/\phi 0)^{(1/4)}].$$

7. An image-forming device comprising:
at least one optical scanning device including:
- a light source;
- a coupling optical system coupling a light beam projected from said light source;
- a deflection mirror;
- a linear image optical system forming said light beam from said coupling optical system into a linear image in a vicinity of the deflection mirror;
- the deflection mirror reflectively deflecting said light beam from said linear image optical system by performing a sine-wave oscillation; and
- a reflective surface placed opposite said deflection mirror so as to reflect said light beam reflectively deflected by said deflection mirror to said deflection mirror; and
- a scanning optical system composed of a scanning lens causing said light beam to scan a scanned surface of an image-bearing member at a substantially constant velocity so as to form an electrostatic latent image on said scanned surface of said image-bearing member, the light beam being reflectively deflected by said deflection mirror at least twice, wherein the following conditional expression is fulfilled:

$$0.4 < \Phi max/\Phi 0 < 0.9/[(20/(\Phi 0 \times M))^{(1/4)}],$$

where:
- $\Phi 0$ is an amplitude angle of said sine-wave oscillation of said deflection mirror, the amplitude angle being represented by degrees;
- $\Phi max$ is a maximum rotational angle of said deflection mirror corresponding to an effective write width, the maximum rotational angle being represented by degrees; and
- M is a number of times said light beam is reflectively deflected by said deflection mirror.

8. The image-forming device as claimed in claim 7, wherein the following conditional expression is fulfilled:

$$0.5 < \phi max/\phi 0 < 0.8/[(20/(\phi 0 \times M))^{(1/4)}].$$

* * * * *